United States Patent [19]

Robillard

[11] Patent Number: 4,471,580
[45] Date of Patent: Sep. 18, 1984

[54] WHEEL WEAR COMPENSATION CONTROL FOR GRINDING MACHINE FEED CYCLE

[75] Inventor: Edward G. Robillard, Cherry Valley, Mass.

[73] Assignee: Cincinnati Milacron Inc., Cincinnati, Ohio

[21] Appl. No.: 391,486

[22] Filed: Jun. 24, 1982

[51] Int. Cl.³ .............................................. B24B 49/18
[52] U.S. Cl. ............................... 51/165.87; 51/165.93
[58] Field of Search ........... 51/165 R, 165.87, 165.88, 51/165.93; 318/571, 572

[56] References Cited

U.S. PATENT DOCUMENTS

| | | | |
|---|---|---|---|
| 2,652,663 | 9/1953 | Taylor | 51/165 R |
| 3,403,480 | 10/1968 | Robillard | 51/165 R |
| 3,561,168 | 2/1971 | Robillard | 51/165.75 |
| 3,798,845 | 3/1974 | Stevens | 51/165.87 |
| 3,840,792 | 10/1974 | Yokoe | 51/165.87 |
| 3,895,279 | 7/1975 | Suzuki | 318/571 |
| 4,071,980 | 2/1978 | Kubo | 51/165.87 |
| 4,118,900 | 10/1978 | Moritomo | 51/165.87 |
| 4,123,878 | 11/1978 | Lizotte | 51/165.87 |

Primary Examiner—Harold D. Whitehead
Attorney, Agent, or Firm—John W. Gregg

[57] ABSTRACT

A grinding machine control is provided having a compensation circuit for providing correction signals to modify the point at which a wheelhead infeed cycle is terminated. The correction signals represent varying infeed offset values produced in response to the number of completed infeed cycles following a grinding wheel sharpening operation. The correction signals are derived from a plurality of empirically determined functions relating the number of completed infeed cycles for a particular combination of workpiece and tooling design to deviations of workpiece diameter from a desired dimension.

12 Claims, 5 Drawing Figures

WHEEL WEAR COMPENSATION CONTROL FOR GRINDING MACHINE FEED CYCLE

BACKGROUND OF THE INVENTION

This invention relates generally to automatic control of machines for grinding. In particular, this invention relates to apparatus for automatically modifying the feed portion of a grinding or abrading machine cycle of operation to reduce deviations of finished part size from desired size without resort to in-process gaging.

It is known that part size deviation from desired size in nongage grinding is dependent on relative forces between the abrading wheel and the workpiece during the infeed portion of the grinding cycle. Although grinding cycles typically include a dwell period at the end of the infeed portion of the cycle, the resultant relief of relative forces between the abrading wheel and the workpiece does not insure that the workpiece finish size shall conform to the desired size. When the grinding wheel is new and relatively sharp, that is, the interstices of the abrading surface are open and the surrounding ridges are well defined, the wheel cuts the workpiece with less relative force than when the wheel is dull. Further, as the wheel wears and is reduced in diameter, the smaller diameter results in a smaller contact area and hence, less relative force between the wheel and the workpiece. As the cutting forces vary throughout the useful life of the cutting wheel, the rate of wheel wear also varys. Heretofore, it has been known to automatically compensate the feed portion of the grinding machine cycle to reflect a reduction of grinding wheel diameter with wear. However, this single compensation is not sufficient to adequately accomodate the effect of grinding force variation over the life of a wheel from its initial condition as a new wheel to the end of its useful life when its diameter is so reduced as to make continued use thereof impractical.

It is therefore, one object of the present invention to provide a control for a grinding machine having automatic compensating circuitry for modifying the infeed portion of a grinding cycle of operation to reduce deviations of final part size occurring over a plurality of workpieces and associated with changing conditions of the grinding wheel.

It is a further object of the present invention to provide a grinding machine infeed control having circuitry for producing a multifunction correction value to modify the infeed portion of the cycle to accomodate final size deviations occurring over a plurality of workpieces and attributable to a plurality of factors associated with changing conditions of the grinding wheel.

It is a still further object of the present invention to provide a grinding machine infeed control having circuitry for applying a first size correction value to a limited number of infeed cycles executed immediately following a grinding wheel sharpening operation and having circuitry for applying a second size correction value to all infeed cycles executed between sharpening operations.

A still further object of the present invention is to provide a grinding machine infeed control having zero shifting circuitry for modifying the final size detection point of the infeed cycle in accordance with two functions, a first function producing an offset value decreasing towards zero with each infeed cycle completion after an initialization and a second function producing an offset value increasing with each infeed cycle completion after the initialization.

Further objects and advantages of the present invention shall become apparent from the drawings and associated description.

SUMMARY OF THE INVENTION

In accordance with the aforesaid objects an automatic infeed control for a grinding machine is provided. The control includes circuitry for controlling the advance of the machine grinding wheel into a rotating workpiece and for determining, without resort to a gage, the point in the infeed cycle when final workpiece size has been reached. Size correction circuitry is provided for off-setting the final size detection point in accordance with two independently adjustable functions associated with the number of infeed cycles completed following a wheel sharpening operation. A first correction circuit is initialized to its maximum correction value as a result of the sharpening operation and produces a reduced correction value with each infeed cycle thereafter until a predetermined number of cycles have been completed without the occurrences of another sharpening operation. A second correction circuit is initialized to zero as a result of a grinding wheel sharpening operation and produces an increased correction value with each infeed cycle completed until the occurrence of another sharpening operation. The outputs of the two correction circuits are combined to produce a single offset value applied to the final size detector. The magnitude of the correction for each cycle is made independently adjustable for each correction circuit.

DESCRIPTION OF THE PREFERRED EMBODIMENT

In order to explain the operation of the present invention an internal grinding machine having a pivoting infeed table and automatic infeed control shall be described in some detail. While this machine and control constitute a preferred embodiment, it is not intended by applicant to so limit the scope of the appended claims to only internal grinding machines or grinding machines using a pivoting infeed table. The machine and control combination constituting the preferred embodiment are manufactured by Cincinnati Milacron Inc. the assignee of the present invention.

Figure 1:
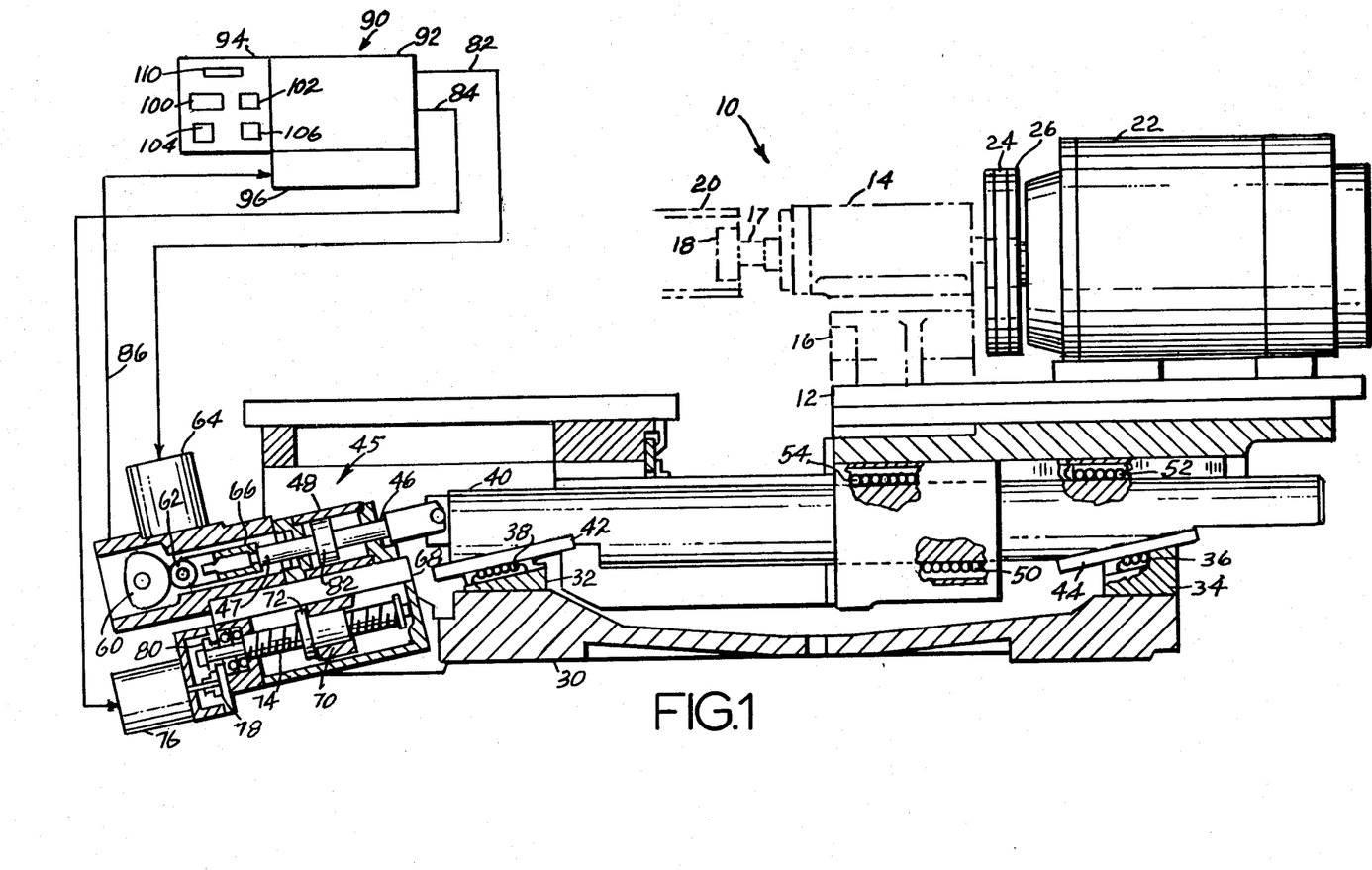
FIG. 1 is a side view with partial sections of a wheelhead feed mechanism shown connected to a control.

Referring now to FIG. 1, a wheelhead feed mechanism 10 is shown connected to the infeed control 90. The internal grinding wheel 18 is shown in the space defined by the internal diameter of a workpiece 20 shown in phantom. In this view, the wheelhead 14 and its suppport 16 are shown in phantom as these machine members would not appear in the section of the machine revealing the details of the infeed mechanism as is apparent from the end view of FIG. 2. Wheelhead 14 includes a shaft 17 upon which grinding wheel 18 is mounted and which is rotated by the grinding wheel motor 22 driving shaft 17 by means of the speed increasing pulley 26 and belt 24. The wheelhead 14 and wheelhead drive motor 22 are mounted upon a pivoting table 12. The workpiece 20 is carried by a rotatable chuck and headstock (not shown) supported upon a table laterally moveable with respect to machine base 30 to position the workpiece longitudinally with respect to grinding wheel 18.

The side of wheelhead table 12 shown in partial section in FIG. 1 is supported by roller bearings 54 and 52 on feed bar 40 and is raised and lowered by the advance and retraction of feedbar 40 effected by push rod 46. The lower surface of feedbar 40 is provided with two wedge pads 42 and 44 slideably supported by rollers 36 and 38. These rollers are mounted on wedges 32 and 34 which are fixed to machine base 30. Motion of feedbar 40 in the direction parallel to its length effects relative motion between wedge pads 42 and 44 and the wedges 32 and 34. The slope of the incline planes of wedges 32 and 34 defines the component of vertical motion resulting from relative motion of the wedge pads 42 and 44 with respect to wedges 32 and 34.

As previously stated, the lateral motion of feedbar 40 is effected by push rod 46 which in turn is driven by piston 82 within hydraulic cylinder 48 and the cam follower 62 riding upon feed cam 60. When the machine cycle of operation requires rapid advance or retraction of the wheelhead 14 relative to workpiece 20 fluid is ported to the appropriate side of piston 82 in hydraulic cylinder 48 to effect rapid motion of push rod 46 in the required direction. Infeed to final size is controlled by cam 60 which is rotated through a gear box (not shown) driven by stepping motor 64. Cam follower 62 rides on cam 60 and is threaded to shaft 47 by collar 66. Shaft 47 is effectively an extension of push rod 46 through piston 82.

The entire push rod actuator assembly 45, i.e., cam drive and hydraulic cylinder 48, is slidably mounted to compensation ways 68. The compensation slide drive mechanism is fixedly mounted to base 30. The push rod actuator assembly 45 is moved relative to slide 68 by means of horn 70 carried by nut 72. The nut 72 is made to move along screw 74 by rotation thereof through the gears 78 and 80 driven by stepping motor 76. It will be appreciated that motion of push rod actuator assembly 45 relative to slide 68 effects a zero shift, a shift of the infeed reference position, of the infeed cam drive mechanism. Thus, when the grinding wheel 18 is trued (squared) or dressed (cleaned) by passage of a sharpening tool across its surface, the resultant reduction in grinding wheel diameter is compensated by movement of the compensating drive nut 72 and the resultant relative motion of the push rod actuator with respect to slide 68. When a new wheel, that is, a wheel of full diameter is installed on wheelhead 14, the compensation slide is commanded to return nut 72 to an initial position from which the dressing compensation increments are to be moved.

The infeed cycle is controlled by control 90 which includes the operator's panel 94, the control circuitry and drive 92 and the machine interface 96. Output commands to the stepping motors 64 and 76 are provided by control circuitry and output drive 92 over lines 82 and 84, respectively. A potentiometer (not shown) for measuring progress through the infeed cycle is driven by feed cam 60 and the infeed position feedback signal, i.e., the actual feed signal derived from the potentiometer is provided to control interface 96 via signal line 86. Operator's panel 94 includes compensation increment set up switches 100, 102, 104, and 106 and the feed position display 110.

Figure 2:
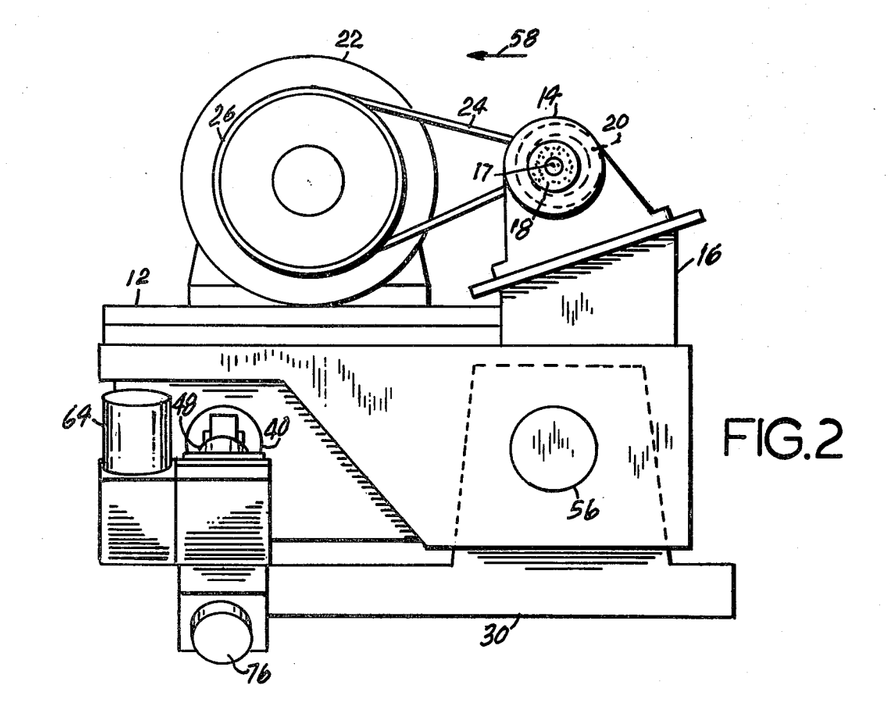
FIG. 2 is an end view of the feed mechanism of FIG. 1 showing the pivot axis of the wheelhead infeed table.

Referring now to FIG. 2, the end view of the infeed mechanism reveals the wheelhead table pivot pin 56 and indicates the direction of feed by arrow 58. It will now be appreciated by those skilled in the art that as feed bar 40 is advanced and retracted over wedges 32 and 34, the wheelhead table 12 is caused to pivot around pivot bar 56 supported by machine base 30. Thus, the actuation of hydraulic cylinder 48 and stepping motors 64 and 76 all combine to effect a resultant feed of wheel 18 against an inside diameter of workpiece 20 which is rotated by its chuck to produce a finished internal diameter.

Figure 3A:
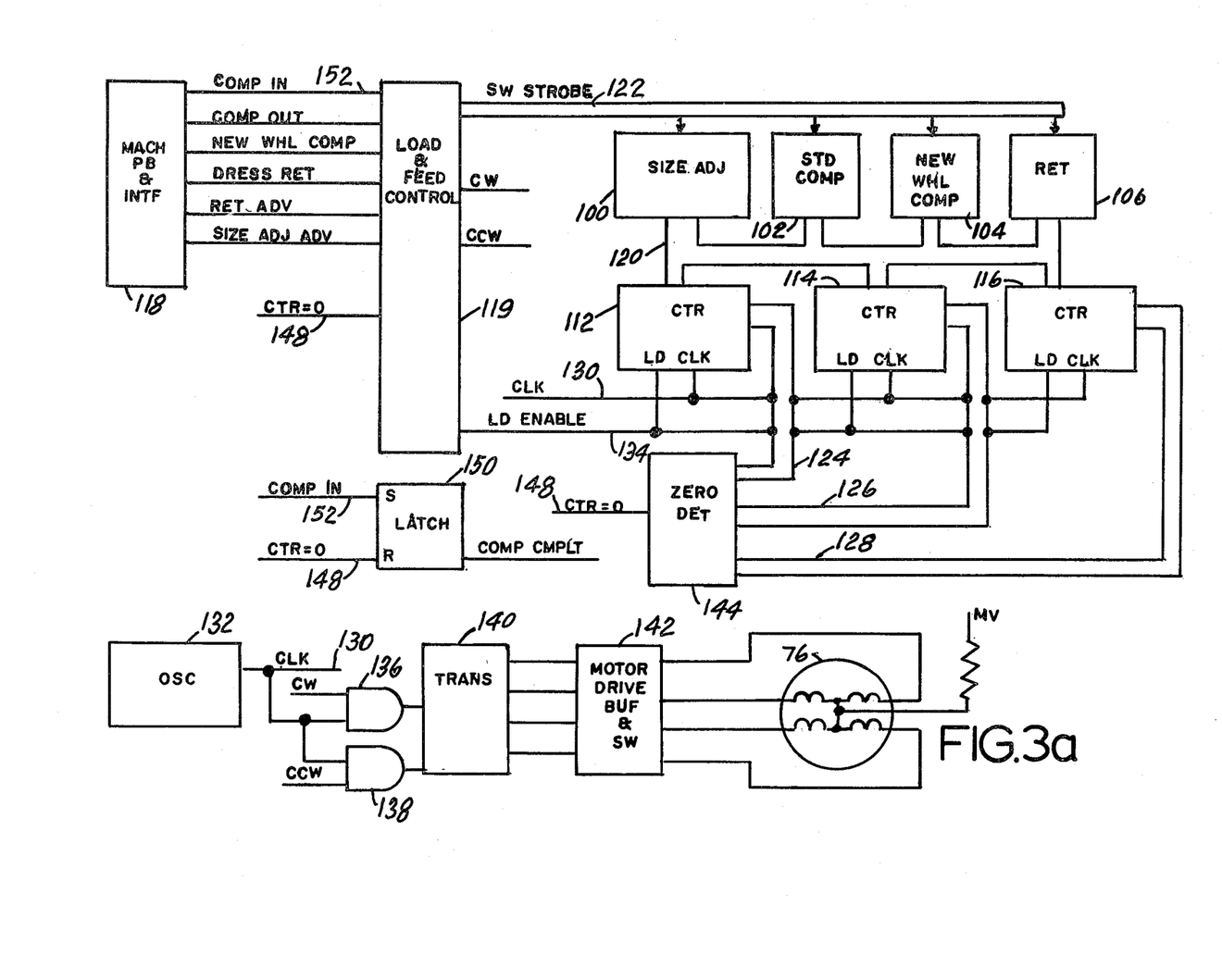
FIGS. 3a and 3b are block diagrams of the control circuitry of FIG. 1.

Referring now to FIG. 3a, a block diagram of the control circuitry for controlling the compensation slide drive is shown. Four distinct types of compensating motion are controlled by means of operator selected increment dimensions. The size adjust input switch set 100 comprise three digits upon which are selected a value to achieve an overall adjustment of the infeed slide to achieve the desired final size of the finished workpiece. A standard compensation input switch pair 102 provides a means for selecting the amount of wheelhead compensation to be effected when the wheelhead sharpening or dressing operation is executed. A new wheel compensation switch pair 104 is provided to permit the operator to select a compensation dimension to accomodate the installation of a new, that is, full diameter grinding wheel. Finally, a retraction compensation switch pair 106 is provided to accomodate the interruption of an infeed cycle for wheelhead dressing or sharpening. During the infeed portion of a grinding cycle, the relative forces between wheel 18 and workpiece 20 cause bending of wheelhead shaft 17. In the event the infeed cycle is interrupted to permit dressing of grinding wheel 18, it is necessary to provide additional compensating motion to account for the relief of the bending of shaft 17 when the wheel is withdrawn from contact from workpiece 20. That is, upon return of wheel 18 to the infeed cycle, it is necessary to provide an additional clearance dimension so that the rapid infeed motion effected by hydraulic cylinder 48 brings grinding wheel 18 to a position short of contact with the internal diameter of workpiece 20.

The outputs of the switch sets 100 through 106 are binary coded decimal data which are in turn loaded into the appropriate of three single digit binary coded decimal counters 112, 114, and 116. The switches which are energized and from which the binary coded decimal data is supplied to the counters 112 through 116 is dependend upon the selections made by the machine operator as reflected by signals produced by the machine push buttons and interface circuits 118. The machine push buttons of operator panel 94 control the selection of switch data and outputs from these push buttons are interfaced at the machine push button and interface circuits 118 to produce command signals for the counter load and feed control circuitry 119. The counter load section of this block produces switch strobe signals on lines 122 to energize the appropriate switch sets 100 through 106. In addition, a load enable signal is produced to permit data at the output of the switch sets to be preset into the counters 112 through 116 and this load enable signal is shown on line 134.

When the load operation has been completed, the feed control circuitry produces a clockwise (CW) or counterclockwise (CCW) signal to enable the operation of the compensation slide stepping motor 76. An oscillator 132 provides a clock signal on line 130 which is gated with the clockwise and counterclockwise signals at AND gates 136 and 138, respectively, to produce a pulse train input to the stepping motor translator and driver 140. Translator 140 converts the pulse train to the appropriate switch output states for energizing or deenergizing the stator coils of stepping motor 76. Current drive for these motor coils is provided by the motor drive buffers and switches 142.

The clock on line 130 is also provided as an input to the counters 112 through 116 to decrement those counters from the preset digital information to zero. The BCD output data of counters 112 through 116 are provided to a zero detect circuit 144 on BCD data buses 124, 126, and 128, respectively. When zero detect circuit 144 determines the output of counters 112 through 116 are zero, it produces an output signal on line 148 indicating that the compensation slide command counter is equal to zero. This output resets latches in the feed control section of circuitry 119 to terminate the clockwise or counterclockwise signal and is used by latching circuit 150 to produce an output signal for indicating to the operator that the compensation increment has been executed. This latch is set by a compensation in signal produced on line 152 in response to the operator initiating a manual compensation move. The latch 150 is reset by the counter equal zero output on line 148. The compensation complete output on line 153 from latch 150 is used to energize a light on operator panel 94.

As was previously stated with reference to FIG. 1, the compensation slide motions operate to offset or zero shift the motions effected by the infeed push rod actuator. Thus, with the exception of the size adjust input which is intended to achieve a rough centering of actual workpiece size within a range of deviation, the remaining compensation values are used to offset the infeed control in relatively coarse ways. The compensation slide and the compensation slide control circuitry of control 90 are not intended to correct for final part size deviations from the desired size resulting from variations in the cutting force during the infeed cycle. Compensation circuits and feed mechanisms of the type shown and described are known in the art and are included here to emphasize the distinctions between these types of compensations and the size correction compensations of the present invention.

Figure 3B:
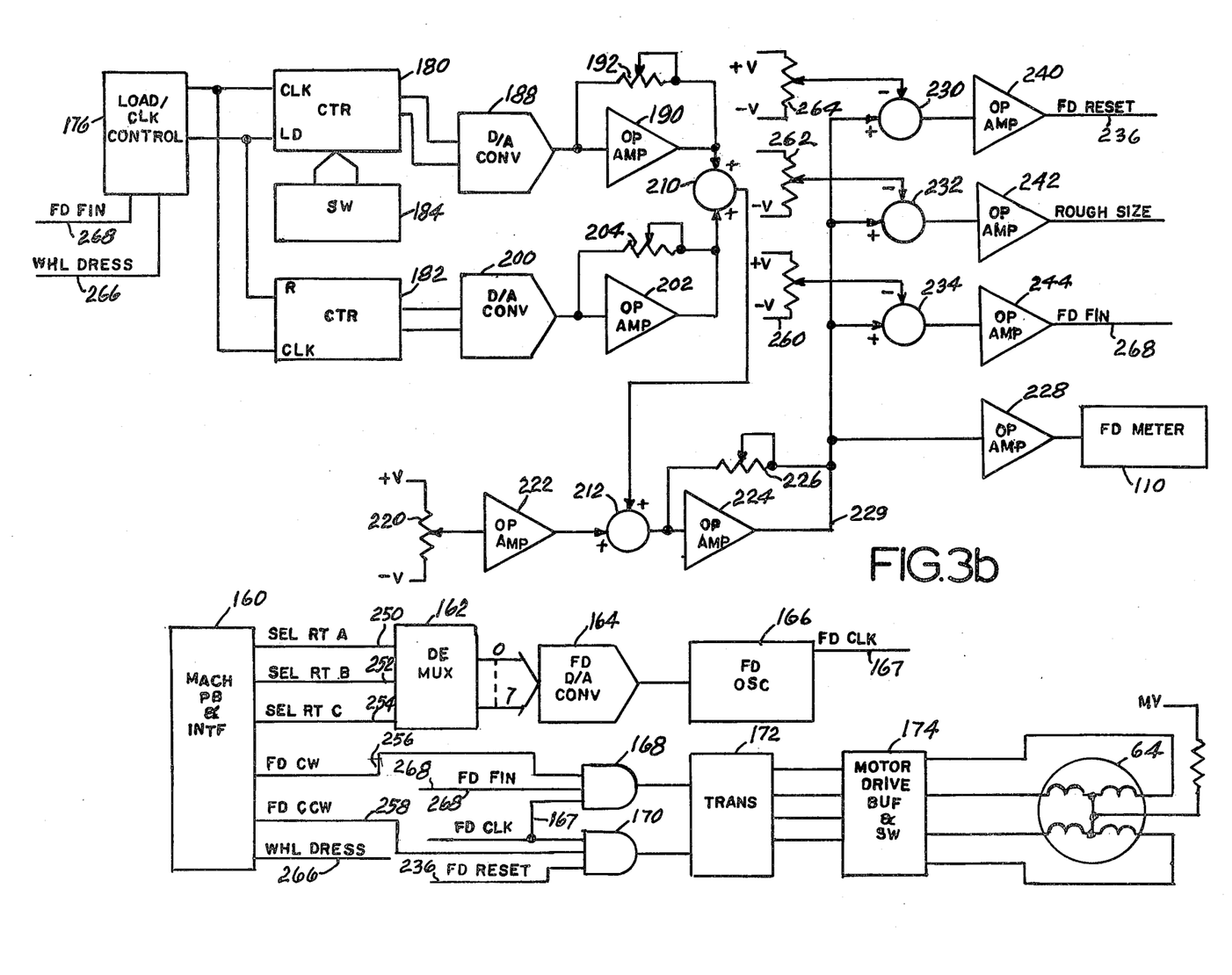

Referring now to FIG. 3b, the infeed cam drive control circuitry shall be described. Cam drive stepping motor 64 is driven in response to signals produced by the operator selections at the operator's panel 94. These push buttons and switches and their associated interfaces 160 produce feed rate selection signals 250, 252, and 254 which are input to the demultiplexer 162 from which eight distinct control signals are produced as inputs to the feed rate digital-to-analogue converter 164. The output of the digital-to-analogue converter 164 is a voltage proportional to the desired feed rate which is input to the voltage controlled feed rate oscillator 166. The output of the feed rate oscillator 166, feed clock (Fd. CLK.) on line 167, is input to the AND gates 168 and 170 to produce the pulse train required by the stepping motor translator and driver 172 to produce the motor coil switching signals. In addition to the feed rate selection signals, feed direction signals, feed clockwise (Fd. CW.) on line 256 and feed counterclockwise (Fd. CCW.) on line 258 are produced by the machine push button interface circuitry 160. Only one direction signal is active at a time. Thus, only one of the AND gates 168 and 170 can produce a pulse stream at any one time. Current drive for the cam drive stepping motor coils is provided by the motor drive buffers and switching amplifiers 174.

As was previously described, the cam drive is linked to a potentiometer so that the rotation of cam 60 is monitored by the voltage fed back from the potentiometer. Continuing with reference to FIG. 3b, the cam feed potentiometer 220 is connected between a positive and negative reference voltage and the potentiometer wiper producing the actual feed signal is interfaced to a buffer amplifier 222. The output of amplifier 222 is a signal representing the position of the infeed cam and is fed through summer 212 to scale amplifier 224. The gain adjustment of amplifier 224 is provided by the potentiometer 226. This scaled signal is applied as an input to the buffer amplifier 228 which in turn drives the feed position meter 110 mounted on operators panel 94. Two additional feed control signals for inhibiting the stepping of cam feed stepping motor 64 are produced. These are the feed reset signal on line 236 to indicate when the cam has been returned to its starting position and the feed finish signal which indicates when the cam has advanced to the final size orientation. The feed reset and feed finish signals are produced by comparing the cam position signal against reference values. Thus, at summmer 234, the output of the scaling amplifier 224 is added to the reference signal derived from feed finish reference potentiometer 260. When the feed finish reference signal and the actual feed signal are equal, the feed finish amplifier will produce the feed finish output signal. This signal is an input to AND gate 168 and would inhibit the further production of stepping motor feed pulses to the translator 172 at the end of an infeed cycle. In a similar fashion, the summer 230 provides the sum of the actual feed signal and the feed reset reference signal derived from potentiometer 264 to produce the feed reset signal at the output of amplifier 240 which is an input to AND gate 170 to inhibit the further production of stepping motor feed pulses at the end of the feed retraction.

An additional reference and comparator are provided to indicate to the operator when the feed has progressed to a point designated as the rough size point. The circuitry for this rough size signal includes amplifier 242, the summer 232 and the reference potentiometer 262. It is contemplated that during the normal operation of the grinding machine there will occur cycles when it is desirable to interrupt the infeed cycle to dress the wheel prior to completing the feed to final size. The rough size reference signal is provided to give an indication when the feed has progressed to a point at which it is expected that the wheel shall have cleaned up the inside diameter of the workpiece. It will now be appreciated that by virtue of the comparators 234 and 232 a zero shift or offset to effectively change the infeed or feed rate controlled portion of the overall machine cycle can be accomplished by changing the apparent value of the feed position signal on line 229.

Two automatic infeed cycle compensating circuits are provided. The outputs of these two circuits are summed at summer 210 to produce a compensation signal representing a value of feed offset which is input to summer 212 to be added to the buffered actual feed signal from amplifier 222 to produce a compensated feed signal. Two distinct functions of correction are provided. The first starts with an initial value and decreases with each workpiece completed until a predetermined number of workpieces have been ground. The initial value is loaded upon completion of a wheel dressing or truing operation consistent with producing a cutting surface on the grinding wheel typically associated with a new wheel. To accomplish this, a counter 180 is preset or initialized to a predetermined value set on switches 184 and loaded into counter 180 upon the occurrence of an initialization signal generated by control circuit 176 when two wheel dressing (Whl. Dress.) signals on line 266 are produced and no feed finish signal intervenes. The initialization signal represents the existence of a condition of the grinding wheel from which wheel wear results in part size deviations predictable as functions of wheel wear associated with completed infeed cycles. The counter 180 is a binary counter and its binary data output is an input to the digital-to-analogue converter 188. The output of converter 188 is a voltage proportional to the magnitude of the binary number in counter 180 and is scaled by the amplifier 190 and its associated gain adjusting potentiometer 192. Counter 180 is a binary down counter and is clocked in response to the completion of an infeed cycle as indicated by the occurrence of the feed finish signal on line 268. The counter is not permitted to count below zero. Thus, following a wheel sharpening operation, this first compensation circuit produces a decreasing value correction signal representing a feed offset increment decreasing with an increasing number of completed grind cycles. This first correcting signal is an input to summer 210.

A second compensating circuit is provided including resettable binary counter 182 which is reset to zero upon completion of a grinding wheel sharpening operation. Thereafter, each completed infeed cycle increments counter 182 until another wheel sharpening operation occurs. The binary data output of counter 182 is an input to the digital-to-analogue converter 200 which produces an analogue voltage proportional to the magnitude of the number in counter 182. This signal is scaled by amplifier 202 and its associated gain adjusting potentiometer 204 thus permitting adjustment of the output to accommodate variations in wheels and workpiece geometries. The output of amplifier 202 is a second correction signal representing a feed offset increment and is added to the output from the first compensation circuit at summer 210. Thus, the output of summer 210 is a single compensation signal representing a value of feed offset derived from a plurality of functions.

It will now be appreciated by those skilled in the art that while it is the choice of applicants to control the cam feed stepping motor 64 by means of an analogue position signal and comparison thereof with analogue reference signals and further that while the compensation of these analogue signals are accomplished by means of digital-to-analogue converters, a totally equivalent control scheme could be effected entirely by digital means. In particular, if a total feed distance were predetermined corresponding to rotation of the infeed cam through one revolution, then the modification of this dimension defining final size could be accomplished digitally by means of addition or subtraction of predefined increments with each completed infeed cycle. Counters would be provided as described herein to monitor the number of completed cycles following a grinding wheel sharpening operation and total correction signals could be accumulated in registers with each completed infeed cycle.

Figure 4:
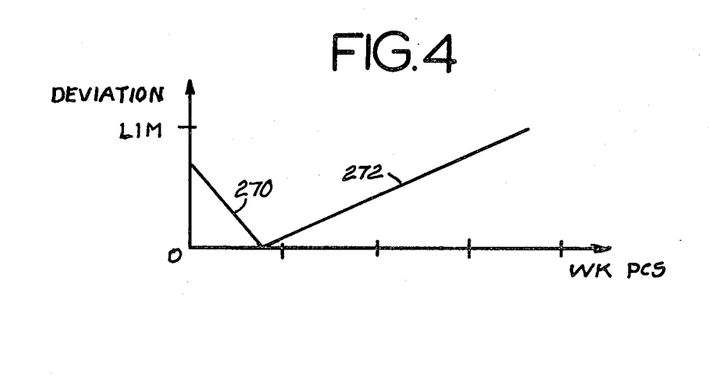
FIG. 4 is a graph relating the deviations of workpiece final size with the number of workpieces ground.

The modification circuit operation shall be described with reference to the graph of FIG. 4. In this Figure, the final size deviation is shown on the vertical axis and the number of completed workpieces shown on the horizontal axis. By actual part measurement, it has been determined that following the installation of a new wheel which has been dressed to the appropriate starting size, the diameters of the workpieces gradually decrease until a limited number of workpieces has been ground. Thereafter, the diameters gradually increase as the grinding wheel diameter is reduced until the deviation from desired final size reaches the acceptable limit requiring replacement of the grinding wheel.

The correction circuit of the present invention are provided to compensate the cam feed position signal to zero shift the apparent final size point to correct for these two workpiece size deviation functions. The actual amount of correction must be determined empirically as must the number of workpieces to which the first correction is to be applied. The first deviation function associated with the line 270 of FIG. 4 starting at zero workpieces and going to zero deviation, arbitrarily chosen as the lower limit of diameter deviation, is accounted for by the counter 180 which is preset to the number of completed workpieces under the line 270. This counter and its associated digital-to-analogue converter thus produce a correction signal representing an initial maximum feed offset value and decreasing offset values as the number of workpieces increases until reaching the zero deviation point of line 270. At this point, counter 180 would have been decremented to zero and no further compensation values would be provided by this circuit until it is again initialized by the grinding wheel sharpening operation. By contrast, the counter 182 is initialized to zero by the sharpening operation and together with converter 200 produces a correction signal representing an increasing feed offset value as it is incremented with each infeed cycle completion. The result of this compensation value is to correct for the effects corresponding to line 272 of FIG. 4.

It is believed that line 270 corresponds to the initial dulling effects as a new wheel gradually requires greater force to cut the workpiece diameter. As the number of completed workpieces and hence completed infeed cycles gradually increases, the combination of normal wheel wear and intermittent dressing operations reduces the wheel diameter thus reducing the grinding force and producing the gradual increase in workpiece size diameter illustrated by line 272. Applicant has found that the total envelope of part size deviation can be substantially reduced by means of the automatic compensating circuits. It should now be appreciated that unlike previously known wheel wear compensation circuits the combination of the two size correcting circuits achieve the reduction of final part size deviation from the desired size by accomodating changes of the grinding wheel cutting condition over a plurality of workpiece grinding cycles. These two corrections circuits give substantial improvement to part size integrity without resort to in-process gaging which, in some applications, may be impractical. It will further be appreciated that the combination of automatic correction circuits are not limited in their applicability to internal grinders or grinding infeed mechanisms of the type described in detail with reference to the preferred embodiment.

While the invention has been illustrated in some detail according to the preferred embodiments shown in the accompanying drawings, and while the preferred embodiment has been described in some detail, there is no intention to thus limit the invention to such detail. On the contrary, it is intended to cover all modifications, alterations, and equivalents falling within the spirit and scope of the appended claims.

What is claimed is:

1. Apparatus for controlling an infeed portion of an automatic grinding cycle for producing workpieces of rotation by abrading contact between a workpiece surface and an abrasive grinding wheel, the control effective to reduce deviations of finished workpiece size from a desired dimension of a plurality of workpieces as wheel conditions change with wear, the apparatus comprising:
   (a) means for producing an actual feed signal representing the progress of the infeed portion of the grinding cycle;
   (b) means for producing an initialization signal representing the existance of a condition of the grinding wheel from which wheel wear results in workpiece size deviations predictable as functions of completed grind cycles;
   (c) means for producinng a compensation signal representing a value of feed offset derived from a function producing varying values with an increasing number of completed grind cycles following the inialization signal; and
   (d) means responsive to the actual feed signal and the compensation signal for producing a feed finish signal representing the end of the infeed portion of the grind cycle.

2. The apparatus of claim 1 wherein the compensation signal producing means further comprises:
   (a) counting means for counting the number of occurrences of feed finish signals following the initialization signal; and
   (b) scaling means for scaling the magnitude of the contents of the counting means to produce the compensation signal.

3. The apparatus of claim 2 wherein the scaling means is made adjustable to provide selectable offset values to accommodate variations in grinding wheels and workpieces.

4. Apparatus for controlling an infeed portion of an automatic grinding cycle for producing workpieces of rotation by abrading contact between a workpiece surface and an abrasive grinding wheel, the control effective to reduce deviations of finished workpiece size from a desired dimension of a plurality of workpieces as wheel conditions change with wear, the apparatus comprising:
   (a) means for producing an actual feed signal representing the progresss of the infeed portion of the grinding cycle;
   (b) means for producing an initialization signal representing the existance of a condition of the grinding wheel from which wheel wear results in workpiece size diviations predictable as functions of the number of completed grind cycles;
   (c) means for producing a compensation signal representing a value of feed offset derived from a plurality of empirical functions relating values of part size deviation with an increasing number of completed grind cycles following the initialization signal;
   (d) means responsive to the actual feed signal and the compensation signal for producing a feed finish signal representing the end of the infeed portion of the grind cycle.

5. The apparatus of claim 4 wherein the means for producing the compensation signal further comprises:
   (a) means for producing a first correction signal representing a feed offset increment derived from a first function producing decreasing values of offset with an increasing number of grind cycles; and
   (b) means for producing a second correction signal representing a second value of feed offset increment derived from a function producing increasing values with an increasing number of grind cycles.

6. The apparatus of claim 5 wherein the first correction signal producing means further comprises:
   (a) a presettable down counter responsive to the initialization signal and the feed finish signal for producing a decreasing value following initialization; and
   (b) a scaling means for producing the first correction signal in proportion to the contents of the down counting means.

7. The apparatus of claim 6 wherein the second correction signal producing means further comprises:
   (a) a resettable counter responsive to the initialization signal and the feed finish signal for producing an increasing value with an increasing number of completed grind cycles; and
   (b) a scaling means for producing the second correction signal in proportion to the contents of the counting means.

8. Apparatus for modifying a feed rate controlled portion of an automatic grinding cycle for producing workpieces of rotation by abrading contact between a workpiece surface and an abrasive grinding wheel, the cycle modifications effective to reduce deviations of finished workpiece size from a desired dimension as wheel conditions change with wear, the apparatus comprising:
   (a) means for producing an actual feed signal representing the progress of the feed rate controlled portion of the grinding cycle;
   (b) means for producing an initialization signal corresponding to a condition of the grinding wheel from which wheel wear results in workpiece size deviations predictable as functions of wheel wear;
   (c) means for producing a first correction signal representing a first value of feed offset derived from a function producing decreasing values with an increasing number of completed grind cycles following the initialization signal;
   (d) means for producing a second correction signal representing a second value of feed offset derived from a function producing increasing values with an increasing number of completed grind cycles following the initialization signal; and
   (e) means responsive to the actual feed signal, the first correction signal, and the second correction signal for producing a feed finish signal representing the end of the feed rate controlled portion of the grind cycle.

9. The apparatus of claim 8 wherein the first correction signal producing means responds to a lessor number of completed grind cycles than does the second correction signal producing means.

10. The apparatus of claim 9 wherein the first correction signal means further comprises:

(a) a presettable binary down counter responsive to the initialization signal and the feed finish signal for producing a decreasing value therein to zero for each completed infeed cycle following the initialization signal; and (b) means responsive to the presettable counter for producing a correction signal representing a value of feed offset to be applied to the actual feed signal to effectively alter the magnitude thereof.

11. The apparatus of claim 10 wherein the means for producing a second compensation signal further comprises:

(a) a resettable binary counting means responsive to the initialization signal and the feed finish signal to produce an increasing count value therein for each completed grind cycle following the initialization signal; and (b) means responsive to the resettable counter for producing a correction signal proportional to the counter contents and representing a value of feed offset to be applied to the actual feed signal to effectively alter the magnitude thereof.

12. The apparatus of claim 11 wherein the feed finish signal means further comprises:

(a) means for summing the first and second correction signals with the actual feed signal to produce a compensated feed signal;

(b) means for producing a feed finish reference signal; and (c) means responsive to the feed finish reference signal and the compensated feed signal for producing a feed finish signal.

* * * * *